July 1, 1924. 1,500,091
W. C. WEISKE ET AL
VISOR FOR AUTOMOBILE WINDSHIELDS
Filed July 26, 1920
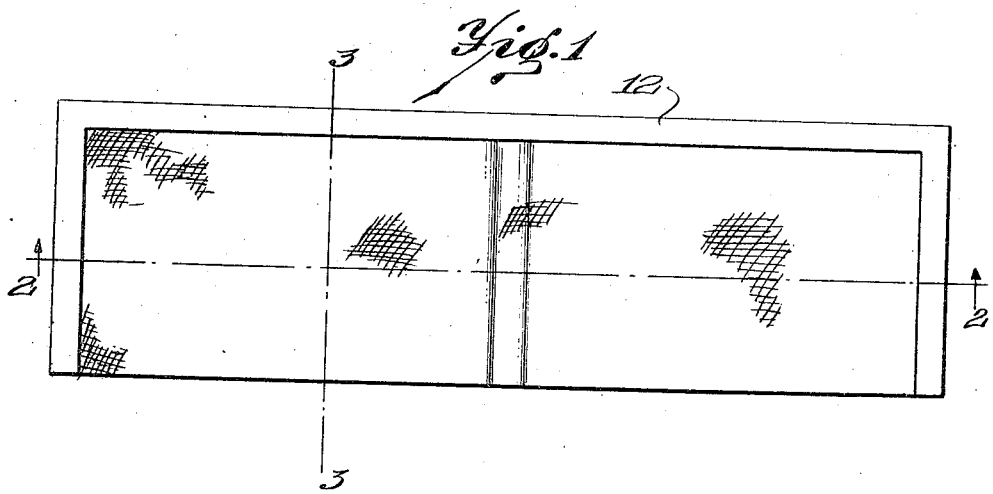
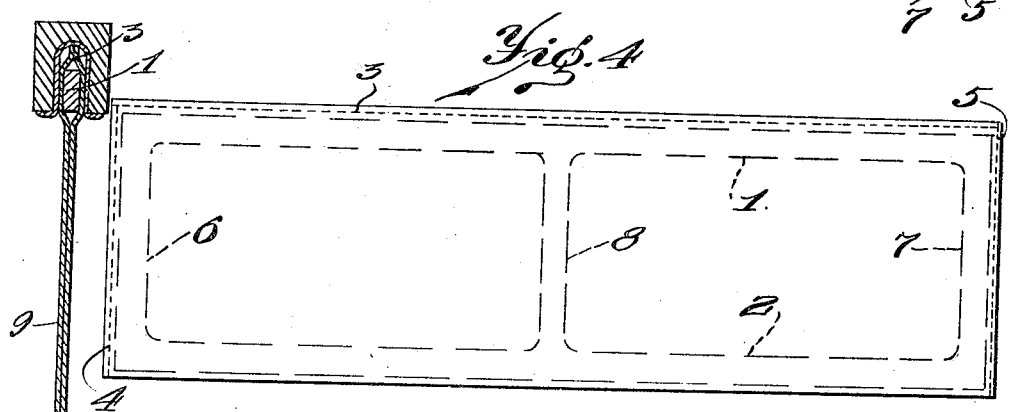
Inventor
WILLIAM C. WEISKE
HARLEY A. DORMAN.
By 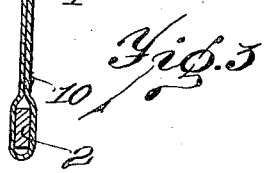
Attorney Patented July 1, 1924.

1,500,091

UNITED STATES PATENT OFFICE.

WILLIAM C. WEISKE AND HARLEY A. DORMAN, OF DETROIT, MICHIGAN; SAID WEISKE ASSIGNOR TO SAID DORMAN.

VISOR FOR AUTOMOBILE WINDSHIELDS.

Application filed July 26, 1920. Serial No. 399,142.

*To all whom it may concern:*

Be it known that we, WILLIAM C. WEISKE and HARLEY A. DORMAN, citizens of the United States, residing at Detroit, county of Wayne, State of Michigan, have invented a certain new and useful Improvement in Visors for Automobile Windshields, and declare the following to be a full, clear, and exact description of the same, such as will enable others skilled in the art to which it pertains to make and use the same, reference being had to the accompanying drawings, which form a part of this specification.

This invention relates to visors for automobile windshields and the object of the invention is to provide an opaque visor which may be substituted for the glass in the usual visor support on an enclosed automobile body. A further object of the invention is to provide a visor of the character described consisting of a strong, rigid metal frame covered with opaque material on both sides sewed together upon three sides of the frame, the said sewed edges being concealed when the visor is positioned within the usual visor support provided on an enclosed automobile body. A novel feature of the invention is involved in the frame and cover construction the frame being provided with cross members to prevent the cover material from sagging and the two sides of the said cover material being cemented together between the cross members to further prevent the same from sagging. A still further object of the invention is to provide a visor having a covering sewed about the frame on three sides, the sewed edges of which are concealed by the visor support, the smooth edge thereof being the only edge visible. These objects and the several novel features of the invention are hereinafter more fully described and claimed and the preferred form of construction by which these objects are attained is shown in the accompanying drawings in which—

Fig. 1 is an elevation of a visor embodying our invention, secured in a visor support.

Fig. 2 is a section taken on line 2—2 of Fig. 1.

Fig. 3 is a section taken on line 3—3 of Fig. 1.

Fig. 4 is an elevation of the visor showing the visor frame by dotted lines.

The device consists of a frame work 1 shown in dotted lines in Fig. 4 which is either stamped from a single piece of heavy sheet metal or formed of several pieces of metal secured together in the form shown to provide a strong and rigid framework. This frame is covered with an opaque fabric such as imitation leather, heavy oil cloth or other similar material, the fabric being preferably waterproofed and black in color to prevent reflection of light. The lower frame member 2 is rounded at the lower edge and the covering material is folded over this rounded edge and the two sides 9 and 10 of the cover are cemented together between the longitudinal frame members 1 and 2 and between the cross members 6 and 8 and 7 and 8 of the frame as indicated more particularly in Figs. 2 and 3. The upper edges of the covering material are then sewed together at 3 above the upper longitudinal frame member 1 and the open ends of the covering material are then sewed together at 4 and 5 at the outer edge of the cross frame members 6 and 7. The cross member 8 provides a support for the cover material at the center and in this manner the cover material is prevented from sagging. This type of visor is adapted to be slipped into the visor support which is usually provided on enclosed automobile bodies the visor support generally being provided with a heavy glass therein which does not protect the eyes and only provides a shield to prevent rain, snow or sleet from collecting on the upper part of the windshield. Our device is intended to replace the glass in the usual type of glass bodies, the glass being withdrawn from the visor frame and our visor inserted as shown more particularly in Figs. 1, 2 and 3. The visor support is usually made with a groove for the glass and a strip of sheet rubber 11 is positioned in this groove to prevent the glass from breaking. When the glass has been removed from the visor support 12 our visor is slipped therein, the sewed edges 3, 4 and 5 of the visor being flexible tend to bind the visor in the visor support and prevent displacement thereof. With a waterproof opaque visor of this type a visor is provided which will not only prevent rain, sleet or snow from gathering on the windshield but also provides a visor which shades the driver's eyes from sunlight and headlight glare.

From the foregoing description it becomes evident that the device is very simple and efficient in operation, of low manufacturing cost and may be positioned in a visor frame as a unit and provides a device which accomplishes the objects desired.

Having thus fully described our invention, its utility and mode of operation, what we claim and desire to secure by Letters Patent of the United States is—

1. A visor for automobile windshields comprising the combination with a three-sided frame member provided with a groove in the inner edges of a substantially rectangular frame of comparatively thin material, an opaque fabric cover therefor, the edges of the cover extending beyond the frame upon three sides and the said three sides being adapted for insertion in the groove with the edges of the fabric cover within the groove and tending to bind the visor member in the said main frame.

2. In a visor for automobile windshields, an opaque covering for the visor adapted to be folded upon itself, a visor frame adapted to be positioned in the said folded cover, a series of cross members to prevent the cover material from sagging, the cover material being sewed together at two ends and one side of the frame and the two opposite sides of the cover being cemented together between the frame members, a three sided visor support positioned over the automobile windshield and adjustable radially, the three sided visor support being grooved on the inner faces thereof, the said visor frame and cover being adapted to be positioned in the grooves in the visor support as a unit, the sewed edges of the cover material being concealed in the said grooves.

In testimony whereof, we sign this specification.

WILLIAM C. WEISKE.
HARLEY A. DORMAN.